United States Patent [19]

de Simone

[11] 4,142,837
[45] Mar. 6, 1979

[54] HELICOPTER BLADE

[75] Inventor: Gary J. de Simone, Stratford, Conn.

[73] Assignee: United Technologies Corporation, Hartford, Conn.

[21] Appl. No.: 850,765

[22] Filed: Nov. 11, 1977

[51] Int. Cl.² ............................................. B64C 27/46
[52] U.S. Cl. ................................ 416/223 R; 416/226; 416/228
[58] Field of Search .......................... 416/223, 226, 228

[56] References Cited

U.S. PATENT DOCUMENTS

| 3,728,045 | 4/1973 | Balch | 416/223 |
| 3,822,105 | 7/1974 | Jepson | 416/223 |
| 3,999,888 | 12/1976 | Zincone | 416/230 X |

Primary Examiner—Everette A. Powell, Jr.
Attorney, Agent, or Firm—Vernon F. Hauschild

[57] ABSTRACT

A helicopter blade of improved airfoil shape which reduces or eliminates retreating blade stall by reducing the magnitude of the upper airfoil blade surface peak pressure and distributes it over a greater chord section of the blade to thereby reduce flow separation and drag.

16 Claims, 8 Drawing Figures

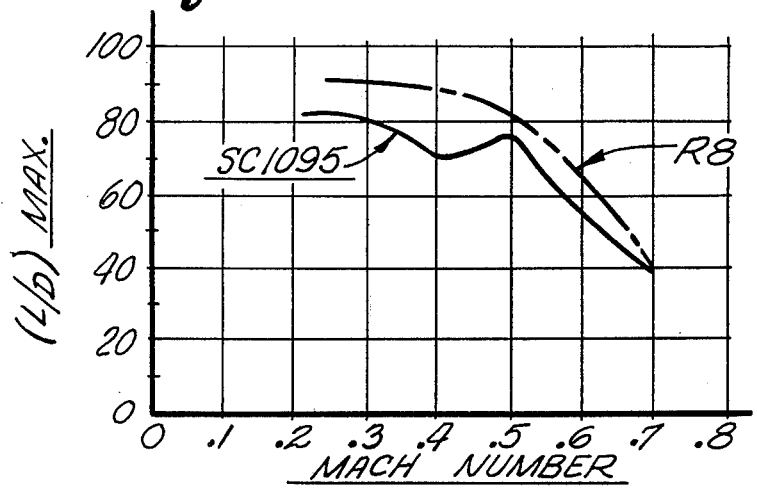
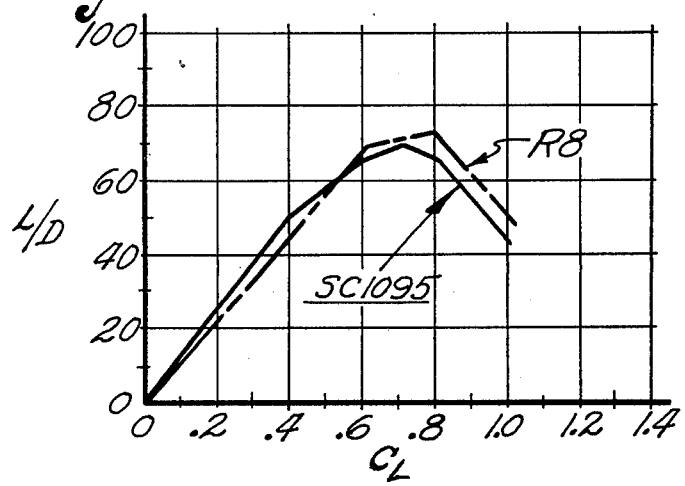

HELICOPTER BLADE

The invention herein described was made in the course of or under a contract or sub-contract thereunder, with the Department of the Army.

BACKGROUND OF THE INVENTION

1. Field of Invention

This invention relates to helicopter blades and more particularly to helicopter blades of selectively shaped cross-sections to remedy retreating blade stall problems.

2. Description of the Prior Art

The helicopter blade taught in the U.S. Pat. No. 3,728,045, hereinafter referred to as blade SC1095, the closest known prior art, produced advantages over prior art blades described therein.

SUMMARY OF THE INVENTION

A primary object of the present invention is to provide an improved helicopter blade which provides advantages over the SC1095 blade by selectively shaping the blade in cross-section to reduce the magnitude of the upper airfoil blade surface pressure peak and distribute the pressure peak over a greater chord section of the blade to abate flow separation and the drag created thereby.

It is a further object of this invention to teach such a blade which is of high lift-to-drag (L/D) ratio and which does not utilize excessive shock wave generation in reducing air flow velocity on the blade upper surface to subsonic at the blade trailing edge. This is accomplished by selectively shaping the blade upper surface curvature to compress the air flow gradually following peak pressure generation.

Other objects and advantages of the present invention may be seen by referring to the following description and claims, read in conjunction with the accompanying drawings.

DESCRIPTION OF THE DRAWINGS

FIG. 6 is a graph of maximum lift-to-drag ratio plotted against Mach number comparing my improved blade to the SC1095 blade.

FIG. 7 is a graph of lift-to-drag ratio plotted against coefficient comparing my improved blade to the SC1095 blade.

DESCRIPTION OF THE PREFERRED EMBODIMENT

This blade is an improvement over blade SC1095 covered by U.S. Pat. No. 3,728,045 to which reference is hereby made and achieves all of the advantages of the SC1095 blade over the prior art, while also increasing maneuverability of the aircraft, reducing control rod loads, and reducing vibration. Accordingly, in this description of my improved blade, comparisons will be made between my improved blade and the SC1095 blade to demonstrate the improvements of my blade thereover.

Figure 1:
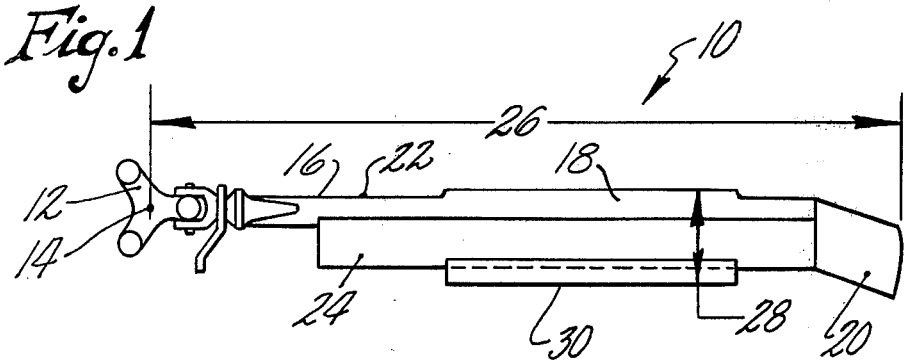
FIG. 1 is a top view of my improved blade.
Figure 2:
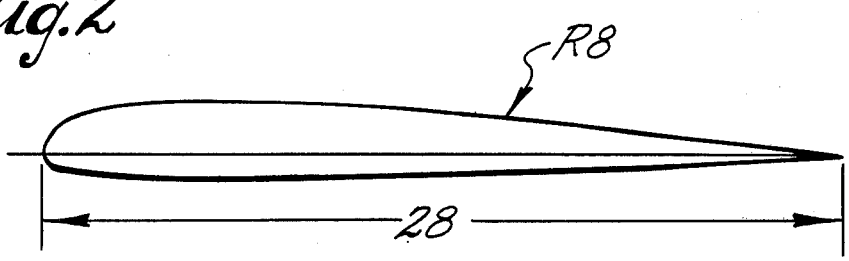
FIG. 2 is a cross-sectional showing of my improved blade.

Referring to FIGS. 1 and 2 we see my improved helicopter blade 10 which is shown to be connected to hub 12 for rotation therewith, and the other blades connected to the hub, about the rotor axis of rotation 14. Blade 10 may be connected to hub 12 in any conventional fashion. Blade 10 includes root portion 16, central or working portion 18 and tip 20, which is preferably swept rearwardly as shown, as well as leading edge 22 and trailing edge 24. The blade span dimension is illustrated at 26 and the blade chord dimension is illustrated at 28.

While blade SC1095 achieved the advantages over the prior art described in U.S. Pat. No. 3,728,045, under certain operating conditions trailing edge stall problems were threatened. My object in designing this improved blade is to eliminate these threats of retreating blade stall problems while maintaining the other advantages of the SC1095 blade. I found that I was able to eliminate the threat of retreating blade stall problem by selectively shaping the airfoil cross-section to reduce the magnitude of the upper airfoil blade surface pressure peak and distribute the pressure peak over a greater chord section of the blade to thereby increase maximum lift and eliminate air flow separation and reduce drag.

Figure 3:
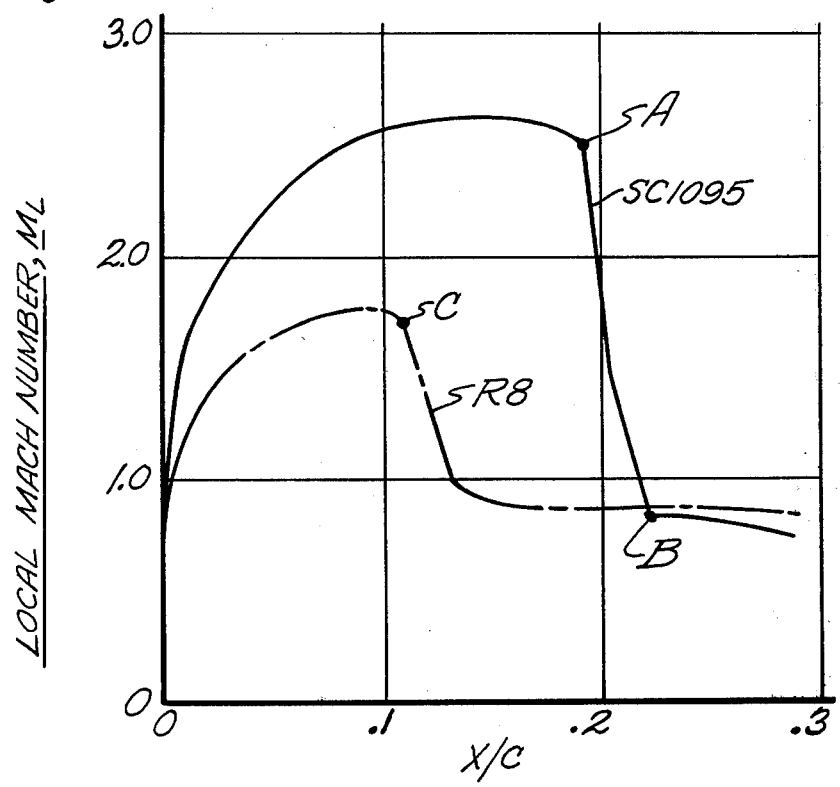
FIG. 3 is a graph of local Mach number along the blade chord comparing my improved blade to the SC1095 blade.

FIG. 3 will now be referred to in demonstrating the advantage of my airfoil, which will henceforth be referred to as the R8 airfoil, over the SC1095 airfoil. FIG. 3 is a graph at constant lift coefficient of the local Mach number along the chord dimension of the blade and it will be noted that for the SC1095 airfoil, the negative pressure peak on airfoil top surface is substantially higher than for my R8 airfoil, thereby establishing a very severe pressure gradient between points A and B, which creates a substantial shock wave. This shock wave serves to reduce the flow velocity across the upper surface of the blade to a point where it is subsonic at the blade trailing edge 24. While this negative pressure pattern illustrated in FIG. 3 for the SC1095 is important for lift generating performance of the blade, by selectively shaping my blade R8 as described hereinafter, I have been able to reduce the peak pressure and therefore the magnitude of the shock wave creating pressure gradient and cause the pressure peak to be distributed over a greater chord section of the blade to thereby avoid the formation of the extreme shock wave on the SC1095 upper surface after it becomes supercritical. In addition, because the negative pressure in my R8 blade is greater than the negative pressure in SC1095 at the downstream chord portions of my blade, as will be explained hereinafter, I eliminate or greatly reduced flow separation and its attendant drag with my R8 construction so that its lift-to-drag (L/D) ratio is appreciably improved over the SC1095 blade. It is important in understanding the FIG. 3 graph to realize that the local Mach number can be changed to pressure coefficient, $C_p$, and the sign of the quantity changes also so that the pressures shown acting on the top airfoil surface is actually a negative pressure.

By viewing FIG. 3 it will be noted that a maximum negative pressure on my blade occurs in the forward 10% chord range.

Figure 4:
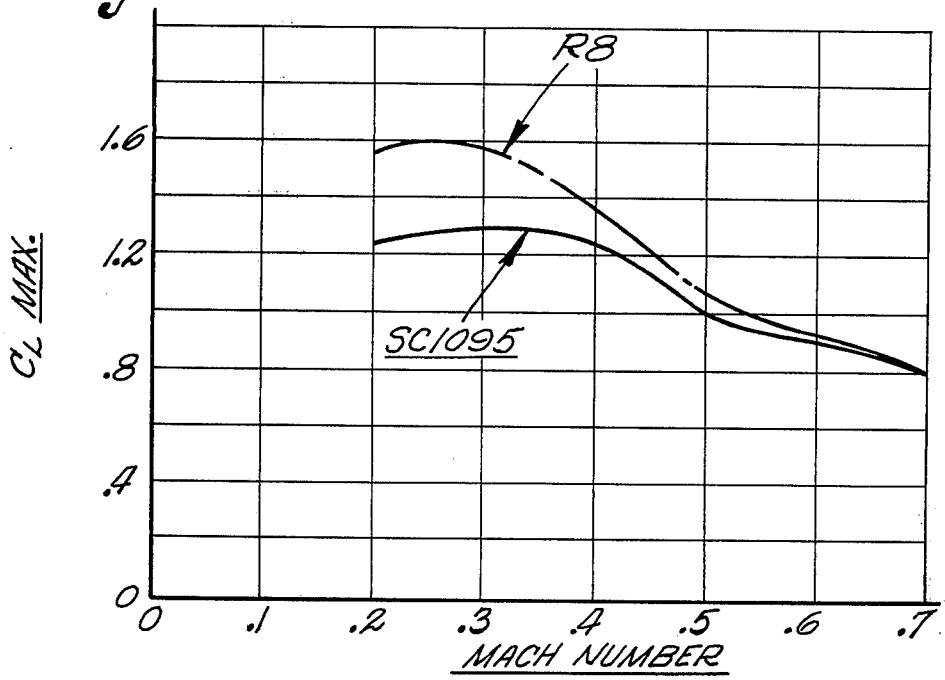
FIG. 4 is a graph of maximum lift coefficient plotted against Mach number of the free stream comparing my improved blade to the SC1095 blade.

To further demonstrate the superiority of my R8 blade over the SC1095 blade, attention is directed to the FIG. 4 graph which shows Mach number of the free stream plotted against the maximum lift coefficient $C_{Lmax}$. It will be noted from FIG. 4 that my R8 blade generates a substantially higher maximum lift coefficient $C_{Lmax}$ then does the SC1095 blade at lower Mach numbers but not at the higher Mach numbers.

Figure 5A:
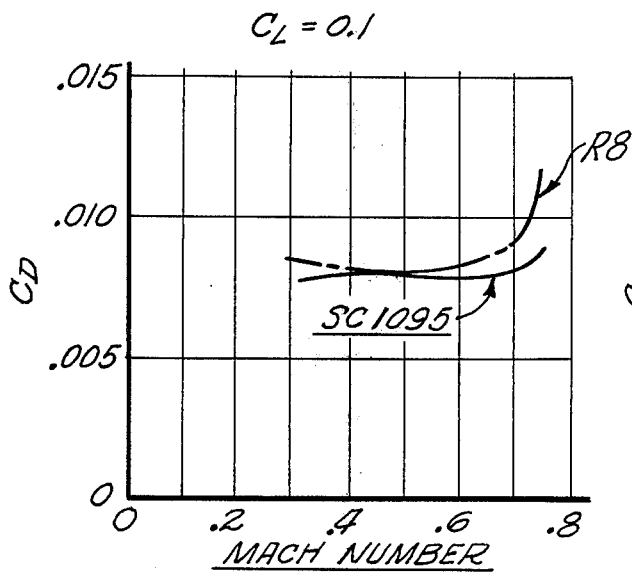
FIGS. 5A and 5B are graphs of drag plotted against Mach number at lift coefficient 0.1 and 0.9, respectively, comparing my improved blade to the SC1095 blade.
Figure 5B:
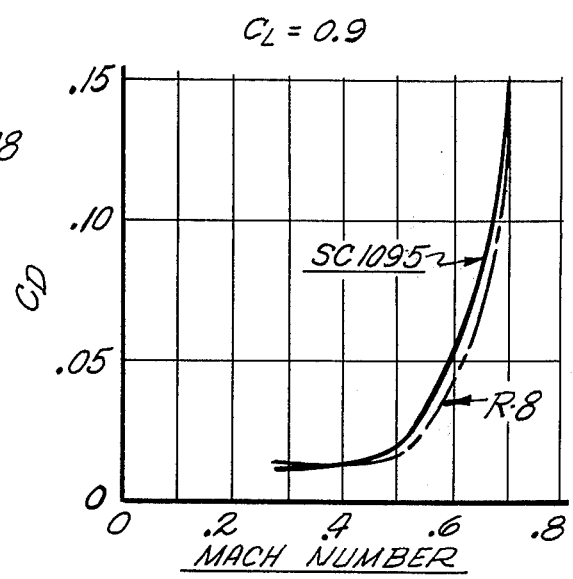

FIGS. 5a and 5b are further performance comparisons between these two blades. FIG. 5a shows that drag on the SC1095 blade is substantially constant throughout the Mach number range given and that my R8 blade drag is substantially equal to the SC1095 drag at the lower Mach numbers but increases above it at the higher Mach numbers. FIG. 5a is plotted at a very low lift coefficient, $C_L$, equal to 0.1, which is representative of blade tip operation. This is why, in my proposed blade, I propose to use cross-section SC1095 at the blade tip, since the tip operates at a higher Mach number.

If pitching moments are of concern, my R8 blade can utilize conventional trailing edge taps 30 to eliminate them.

Now referring to FIG. 5b, we see the drag and Mach number plotted for a much higher lift coefficient $C_L$, equal to 0.9, which is representative of the working section of the blade between the blade tip and the blade root. It should be noted that in the blade air flow Mach number range of interest, which is approximately between 0.3 and 0.5, the drag of both airfoils is substantially the same.

Viewing FIG. 6, we see maximum lift-to-drag ratio, (L/D) max, plotted against Mach number which illustrates the improved performance of my R8 blade over the SC1095 blade in the operating range of interest between Mach number 0.3 and 0.5. The R8 airfoil produces an increase in $C_{Lmax}$ of 0.3 at design point, while only paying a slight penalty in higher drag and pitching moments.

Generally speaking, my blade will be tapered so that it is thickest inboard and as thin as possible outboard. A thick blade tip is not necessary and a thin tip serves to reduce drag at high Mach numbers.

Experience has shown that the blade tip need perform little lifting function since the central or working portion of the blade generates virtually all required lift. In view of this fact, and because the SC1095 blade generates less drag, in the preferred embodiment of my blade shown in FIG. 1 the R8 airfoil section is utilized between approximately the 40% and 80% span stations and the SC1095 cross-sectional shape is used at the blade tip and at the blade root.

A further comparison between the two blades is shown in FIG. 7 which is a plot of lift-to-drag ratio against lift coefficient, $C_L$, compensated for pitching moments, and this plot again demonstrates the superiority of the R8 blade construction.

FIGS. 4 and 6 demonstrate improved lift-to-drag (L/D) ratio performance and max. Lift coefficient ($C_L$max) performance of my R8 blade over the SC1095 blade. This is highly significant in that under circumstances where the SC1095 might experience retreating blade stall and its attendant problems, which include reduced aircraft maneuverability, increased control loads, and increased vibration, retreating blade stall and these attendant problems are reduced or eliminated by my construction.

While my blade airfoil R8 will be described hereinafter in coordinate and equation form, as illustrated in FIG. 2, my R8 airfoil has a thickness of about 9.4% chord dimension and a forward camber with maximum camber at about 1% chord dimension and being located forward of the 30% chord station and is shaped to have a blade pitching moment coefficient within the range ± 0.03, before moment divergence, at all Mach numbers below 0.75 to thereby produce low blade pitching moments without sacrificing higher maximum lift coefficient and drag divergence.

It is conventional to define an airfoil shape by defining the location of the upper airfoil surface and the lower airfoil surface at a series of stations along the blade chord, and then defining the leading edge radius. For example, this is illustrated in the publication "Theory of Wing Selections" by Abbott and Von Doenhoff published by Dover Publications, Inc., New York, copyright 1959, and an illustration of this standard method of airfoil definition will be found at page 412 thereof.

The following table defines my airfoil for any blade thickness.

| UPPER SURFACE | | LOWER SURFACE | |
|---|---|---|---|
| $\frac{X}{C}$ | $\left(\frac{Y}{t}\right)_u$ | $\left(\frac{X}{C}\right)$ | $\left(\frac{Y}{t}\right)_L$ |
| 0.0 | 0.0 | 0.0 | 0.0 |
| .0125 | .26709 | .0125 | −.16856 |
| .025 | .38195 | .025 | −.19970 |
| .05 | .52695 | .050 | −.22892 |
| .075 | .59502 | .075 | −.24165 |
| .10 | .64124 | .10 | −.24984 |
| .15 | .69409 | .15 | −.26081 |
| .20 | .71609 | .20 | −.27062 |
| .25 | .719543 | .25 | −.27972 |
| .30 | .71058 | .30 | −.28651 |
| .40 | .66827 | .40 | −.28788 |
| .50 | .60500 | .50 | −.27405 |
| .60 | .52035 | .60 | −.24495 |
| .70 | .41365 | .70 | −.197299 |
| .80 | .28880 | .80 | −.139302 |
| .90 | .14957 | .90 | −.074209 |
| .975 | .038122 | .975 | −.019721 |
| 1.0 | 0.0 | 1.0 | 0.0 |

Where X is a station along the blade chord, where C is the blade chord, where Yu is the coordinate or location of the upper airfoil surface from the blade chord at station X, where $Y_L$ is the coordinate or location of the lower airfoil from the chord line at station X, where t is maximum blade thickness.

To assist in the understanding of the table given above, it will be helpful to take hypothetical situation in which this table will be used to establish a location of the upper and lower airfoil surfaces, Yu and $Y_L$ at a particular chord station X for a blade of a selected thickness and a selected chord dimension. The following example will illustrate use of the chart to determine the location of Yu and $Y_L$ for the station 0.0125 the chord distance along the chord commencing at the leading edge, for a blade having a maximum thickness of 2 inches and a chord of 20 inches.

The only step necessary in determining Yu is to multiply the Yu/t chart or table entry corresponding to the 0.0125 chord station entry, i.e., 0.1865, by the blade maximum thickness, i.e., 2 inches, so as to give a product of 0.03726 inches. This product constitutes the upper airfoil location, i.e., Yu. Accordingly, we have determined that at chord station 0.0125, the upper airfoil location, Yu is 0.3726 inches above the chord line.

The same procedure would be followed to ascertain the distance $Y_L$ at chord station 0.0125 and, because the entries under the $Y_L/t$ column are in the negative, the quantity so determined would be positioned at the 0.0125 chord station and below the chord line. Following this procedure, we would establish Yu and $Y_L$ for all of the indicated chord stations in the X/C column.

We must next determine the leading edge radius of the upper airfoil surface, Pu, and the leading edge radius of the lower airfoil section $P_L$. We this time follow a two step procedure. In the first step we multiply the blade maximum thickness-to-chord ratio [t/C = 2"/20" = 0.1] squared by the quantity 1.108, i.e., $(0.1)^2$ multiplied by 1.108, which equals 0.01108. This first product represents the upper airfoil leading edge radius Pu divided by chord C. The second step is to multiply the first product by the chord dimension, i.e., 0.01108 times 20 inches, which gives us the second product of 0.2216, which is the upper airfoil surface leading edge radius in the dimension of the chord, namely, inches, and taken from a point on the chord. The lower leading edge radius $P_L$ is computed in the same fashion.

It will be evident from the above description that all quantities listed in the $Y_u$ it and the $Y_L/t$ columns assume a chord dimension of 1. If we are to determine the coordinates for a blade which has a chord other than one, we must accordingly multiply the chart quantities in each of these two columns by the chord dimension.

By utilizing the table given above, we can determine the coordinates of the airfoil cross section of the blade of interest and it has been determined that the above enumerated advantages are still gained by this airfoil when the chart quantities vary throughout a range of ± 3 percent.

Because my blade R8 cannot be described in standard NACA designations, the following table can be used to establish the upper airfoil locations and the lower airfoil locations $Y_u$ and $Y_L$ respectively, at each chord station X/C, along the blade chord.

| UPPER SURFACE | | LOWER SURFACE | |
|---|---|---|---|
| $\frac{X}{C}$ | $\left(\frac{Y}{C}\right)_u$ | $\frac{X}{C}$ | $\left(\frac{Y}{C}\right)_L$ |
| 0.0 | 0.0 | 0.0 | 0.0 |
| .0125 | .0251149 | .0125 | −.0158497 |
| .025 | .0359152 | .025 | −.0187780 |
| .05 | .0495495 | .05 | −.0215250 |
| .075 | .0559500 | .075 | −.0227219 |
| .10 | .0602962 | .10 | −.0234926 |
| .15 | .0652657 | .15 | −.0245243 |
| .20 | .0673344 | .20 | −.0254468 |
| .25 | .0676587 | .25 | −.0263019 |
| .30 | .0668161 | .30 | −.0269408 |
| .40 | .0628376 | .40 | −.0270691 |
| .50 | .0568882 | .50 | −.0257689 |
| .60 | .0489283 | .60 | −.0230331 |
| .70 | .0388951 | .70 | −.0185521 |
| .80 | 0.271559 | .80 | −.0130986 |
| .90 | .0140638 | .90 | −.0069779 |
| .975 | .00358462 | .975 | −.00185432 |
| 1.0 | 0.0 | 1.0 | 0.0 |

Where capital X is the station along the blade chord, C is the blade chord dimension, $Y_u$ is the location of the upper airfoil surface, and $Y_L$ is the location of the lower airfoil surface.

The second table given immediately above differs from the first table in that it defines the specific coordinates for the R8 blade, which has a 9.4% thickness-to-chord (t/C) ratio. The first table given herein is more flexible and, by utilizing the procedure described in connection therewith, the upper and lower airfoil stations can be determined for any thickness-to-chord ratio.

The R8 airfoil cross-section can also be expressed by the following equations:

UPPER SURFACE $$0 \leq \frac{X}{C} \leq .05 \quad \left(\frac{Y}{C}\right)_u = \frac{t}{C}\left[1.57242\sqrt{\frac{X}{C}} + 10.8417\left(\frac{X}{C}\right) - 363.066\left(\frac{X}{C}\right)^2 + 7091.08\left(\frac{X}{C}\right)^3 - 55272.9\left(\frac{X}{C}\right)^4\right]$$

$$.05 \leq \frac{X}{C} \leq .5 \quad \left(\frac{Y}{C}\right)_u = \frac{t}{C}\left[3.16463\sqrt{\frac{X}{C}} - 3.70854\left(\frac{X}{C}\right) + 1.21421\left(\frac{X}{C}\right)^2 - .818669\left(\frac{X}{C}\right)^3 + .325171\left(\frac{X}{C}\right)^4\right]$$

$$.5 \leq \frac{X}{C} \leq 1.0 \quad \left(\frac{Y}{C}\right)_u = \frac{t}{C}\left[2.51607\sqrt{\frac{X}{C}} - 2.29241\left(\frac{X}{C}\right) + .175085\left(\frac{X}{C}\right)^2 - .746467\left(\frac{X}{C}\right)^3 + .347730\left(\frac{X}{C}\right)^4\right]$$

LOWER SURFACE $$0 \leq \frac{X}{C} \leq .05 \left(\frac{Y}{C}\right)_L = \frac{t}{C}\left[-2.43788\sqrt{\frac{X}{C}} + 9.83555\left(\frac{X}{C}\right) - 154.251\left(\frac{X}{C}\right)^2 + 2963.11\left(\frac{X}{C}\right)^3 - 2562.7\left(\frac{X}{C}\right)^4\right]$$

$$.05 \leq \frac{X}{C} \leq .5 \left(\frac{Y}{C}\right)_L = \frac{t}{C}\left[-1.85234\sqrt{\frac{X}{C}} + 4.20202\left(\frac{X}{C}\right) - 10.0045\left(\frac{X}{C}\right)^2\right.$$

LOWER SURFACE $$+ 16.8301 \left(\frac{X}{C}\right)^3 - 10.6863 \left(\frac{X}{C}\right)^4 \Bigg]$$

$$.5 \leq \frac{X}{C} \leq 1.0 \quad \left(\frac{Y}{C}\right)_L = \frac{t}{C} \Bigg[ 2.20451 \sqrt{\frac{X}{C}} - 7.33441 \left(\frac{X}{C}\right) + 10.7399 \left(\frac{X}{C}\right)^4$$

$$- 8.00033 \left(\frac{X}{C}\right)^3 + 2.39031 \left(\frac{X}{C}\right)^4 \Bigg]$$

Where X is a station along the blade chord, where C is the blade chord dimension, where $Y_u$ is the distance of the upper airfoil at chord station X above the chord, where t is the blade maximum thickness, where $Y_L$ is the distance of the lower airfoil surface of the blade at chord station X from the chord.

Similar to the tables given above, an airfoil section rendering the benefits of my teachings will be derived by following the formula to ascertain all necessary co-ordinates $Y_u$ and $Y_L$ for each chord station X, and within a range of ± 3 percent of these $Y_u$ and $Y_L$ values.

I wish it to be understood that I do not desire to be limited to the exact details of construction shown and described, for obvious modifications will occur to a person skilled in the art.

I claim:

1. A helicopter blade having a chord, thickness, and a span and further having: A) a root portion adapted to be connected to a rotor hub, B) a tip portion defining the blade portion farthest from said root portion, C) a central portion extending between and attached to said root portion and said tip portion and cooperating therewith to define blade span and being shaped to define an airfoil of cross section in accordance with the equation throughout at least a portion of the central portion span,

UPPER SURFACE $$0 \leq \frac{X}{C} \leq .05 \quad \left(\frac{Y}{C}\right)_u = \frac{t}{C} \Bigg[ 1.57242 \sqrt{\frac{X}{C}} + 10.8417 \left(\frac{X}{C}\right)$$

$$- 363.066 \left(\frac{X}{C}\right)^2 + 7091.08 \left(\frac{X}{C}\right)^3 - 55272.9 \left(\frac{X}{C}\right)^4 \Bigg]$$

$$.05 \leq \frac{X}{C} \leq .5 \quad \left(\frac{Y}{C}\right)_u = \frac{t}{C} \Bigg[ 3.16463 \sqrt{\frac{X}{C}} - 3.70854 \left(\frac{X}{C}\right)$$

$$+ 1.21421 \left(\frac{X}{C}\right)^2 - .818669 \left(\frac{X}{C}\right)^3 + .325171 \left(\frac{X}{C}\right)^4 \Bigg]$$

$$.5 \leq \frac{X}{C} \leq 1.0 \quad \left(\frac{Y}{C}\right)_u = \frac{t}{C} \Bigg[ 2.51607 \sqrt{\frac{X}{C}} - 2.29241 \left(\frac{X}{C}\right)$$

$$+ .175085 \left(\frac{X}{C}\right)^2 - .746467 \left(\frac{X}{C}\right)^3 + .347730 \left(\frac{X}{C}\right)^4 \Bigg]$$

LOWER SURFACE $$0 \leq \frac{X}{C} \leq .05 \quad \left(\frac{Y}{C}\right)_L = \frac{t}{C} \Bigg[ -2.43788 \sqrt{\frac{X}{C}} + 9.83555 \left(\frac{X}{C}\right) -$$

$$154.251 \left(\frac{X}{C}\right)^2 + 2963.11 \left(\frac{X}{C}\right)^3 - 25652.7 \left(\frac{X}{C}\right)^4 \Bigg]$$

$$.05 \leq \frac{X}{C} \leq .5 \quad \left(\frac{Y}{C}\right)_L = \frac{t}{C} \Bigg[ -1.85234 \sqrt{\frac{X}{C}} + 4.20202 \left(\frac{X}{C}\right) -$$

$$10.0045 \left(\frac{X}{C}\right)^2 + 16.8301 \left(\frac{X}{C}\right)^3 - 10.6863 \left(\frac{X}{C}\right)^4 \Bigg]$$

$$.5 \leq \frac{X}{C} \leq 1.0 \quad \left(\frac{Y}{C}\right)_L = \frac{t}{C} \Bigg[ 2.20451 \sqrt{\frac{X}{C}} - 7.33441 \left(\frac{X}{C}\right) +$$

$$10.7399 \left(\frac{X}{C}\right)^2 - 8.00033 \left(\frac{X}{C}\right)^3 + 2.39031 \left(\frac{X}{C}\right)^4 \Bigg].$$

2. A helicopter blade according to claim 1 wherein said central portion extends between at least the blade 40% span station and the blade 80% span station.

3. A helicopter blade according to claim 2 and including blade trailing edge tabs selectively sized and oriented to eliminate pitching moment.

4. A helicopter blade according to claim 3 wherein the maximum negative pressure acting on the blade upper surface occurs in the forward 10% of the blade chord.

5. A helicopter blade according to claim 4 wherein said tip portion is swept rearwardly with respect to said central portion.

6. A helicopter blade having a chord, thickness, and a span and further having:
(A) a root portion adapted to be connected to a rotor hub,
(B) a tip portion defining the blade portion farthest from said root portion,
(C) a central portion extending between and attached to said root portion and said tip portion and cooperating therewith to define blade span and being shaped to define an air-foil of cross section defined by the coordinate system throughout at least a portion of the central portion span:

| UPPER SURFACE | | LOWER SURFACE | |
|---|---|---|---|
| $\frac{X}{C}$ | $\left(\frac{Y}{t}\right)_u$ | $\left(\frac{X}{C}\right)$ | $\left(\frac{Y}{t}\right)_L$ |
| 0.0 | 0.0 | 0.0 | 0.0 |
| .0125 | .26709 | .0125 | −.16856 |
| .025 | .38195 | .025 | −.19970 |
| .05 | .52695 | .050 | −.22892 |
| .075 | .59502 | .075 | −.24165 |
| .10 | .64124 | .10 | −.24984 |
| .15 | .69409 | .15 | −.26081 |
| .20 | .71609 | .20 | −.27062 |
| .25 | .719543 | .25 | −.27972 |
| .30 | .71058 | .30 | −.28651 |
| .40 | .66827 | .40 | −.28788 |
| .50 | .60500 | .50 | −.27405 |
| .60 | .52035 | .60 | −.24495 |
| .70 | .41365 | .70 | −.197299 |
| .80 | .28880 | .80 | −.139302 |
| .90 | .14957 | .90 | −.074209 |
| .975 | .038122 | .975 | −.019721 |
| 1.0 | 0.0 | 1.0 | 0.0 |

7. A helicopter blade according to claim 6 wherein said central portion extends between at least the blade 40% span station and the blade 80% span station.

8. A helicopter blade according to claim 7 and including blade trailing edge tabs selectively sized and oriented to eliminate pitching moment.

9. A helicopter blade according to claim 8 wherein the maximum negative pressure acting on the blade upper surface occurs in the forward 10% of the blade chord.

10. A helicopter blade according to claim 9 wherein said tip portion is swept rearwardly with respect to said central portion.

11. A helicopter blade having a thickness, a span and a chord, and further having:
(A) A root portion adapted to be connected to a rotor hub,
(B) a tip portion defining the blade portion farthest from said root portion,
(C) a central portion extending between and attached to said root portion and said tip portion and cooperating therewith to define blade span and being shaped to define an airfoil of cross-section defined by the coordinate system:

| UPPER SURFACE | | LOWER SURFACE | |
|---|---|---|---|
| $\frac{X}{C}$ | $\left(\frac{Y}{C}\right)_u$ | $\frac{X}{C}$ | $\left(\frac{Y}{C}\right)_L$ |
| 0.0 | 0.0 | 0.0 | 0.0 |
| .0125 | .0251149 | .0125 | −.0158497 |
| .025 | .0359152 | .025 | −.0187780 |
| .05 | .0495495 | .05 | −.0215250 |
| .075 | .0559500 | .075 | −.0227219 |
| .10 | .0602962 | .10 | −.0234926 |
| .15 | .0652657 | .15 | −.0245243 |
| .20 | .0673344 | .20 | −.0254468 |
| .25 | .0676587 | .25 | −.0263019 |
| .30 | .0668161 | .30 | −.0269408 |
| .40 | .0628376 | .40 | −.0270691 |
| .50 | .0568882 | .50 | −.0257689 |
| .60 | .0489283 | .60 | −.0230331 |
| .70 | .0388951 | .70 | −.0185521 |
| .80 | 0.271559 | .80 | −.0130986 |
| .90 | .0140638 | .90 | −.0069779 |
| .975 | .00358462 | .975 | −.00185432 |
| 1.0 | 0.0 | 1.0 | 0.0 |

Where capital X is the station along the blade chord, C is the blade chord dimension, $Y_u$ is the location of the upper airfoil surface, and $Y_L$ is the location of the lower airfoil surface.

12. A helicopter blade according to claim 11 wherein said central portion extends between at least the blade 40% span station and the blade 80% span station.

13. A helicopter blade according to claim 12 and including blade trailing edge tabs selectively sized and oriented to eliminate pitching moment.

14. A helicopter blade according to claim 13 wherein the maximum negative pressure acting on the blade upper surface occurs in the forward 10% of the blade chord.

15. A helicopter blade according to claim 14 wherein said tip portion is swept rearwardly with respect to said central portion.

16. A helicopter blade having a thickness, a span and a chord, and further having:
(A) a root portion adapted to be connected to a rotor hub,
(B) a tip portion defining the blade portion farthest from said root portion,
(C) a central portion extending between and attached to said root portion and said tip portion and cooperating therewith to define blade span and having a thickness of about 9.4 percent chord dimension and a forward camber, with maximum camber at about 1 percent chord dimension and being located forward of the 30 percent chord station and shaped so as to have a blade pitching moment coefficient within the range ± 0.03 before moment divergence at all Mach numbers below 0.75 to thereby produce low blade pitching moments without sacrificing higher maximum lift coefficient and drag divergence.

* * * * *

UNITED STATES PATENT AND TRADEMARK OFFICE
CERTIFICATE OF CORRECTION

PATENT NO. : 4,142,837
DATED : March 6, 1979
INVENTOR(S) : Gary de Simone

It is certified that error appears in the above–identified patent and that said Letters Patent are hereby corrected as shown below:

Column 6, Line 8   "0.271559" should be ".0271559"

Column 6, Line 52  "-2562.7" should be "-25652.7"

Column 7, Line 10 "+10.7399 $(\frac{X}{C})^4$" should be "-10.7399 $(\frac{X}{C})^2$"

Signed and Sealed this

*Eighth* Day of *January 1980*

[SEAL]

*Attest:*

SIDNEY A. DIAMOND

*Attesting Officer*   *Commissioner of Patents and Trademarks*